United States Patent
Liu et al.

(10) Patent No.: US 10,914,951 B2
(45) Date of Patent: Feb. 9, 2021

(54) VISUAL, AUDIBLE, AND/OR HAPTIC FEEDBACK FOR OPTICAL SEE-THROUGH HEAD MOUNTED DISPLAY WITH USER INTERACTION TRACKING

(71) Applicant: QUALCOMM Incorporated, San Diego, CA (US)

(72) Inventors: Kexi Liu, San Diego, CA (US); Vijay Naicker Subramaniam, San Diego, CA (US); Md Sazzadur Rahman, San Diego, CA (US); Martin H. Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 14/162,668

(22) Filed: Jan. 23, 2014

(65) Prior Publication Data
US 2015/0049012 A1    Feb. 19, 2015

Related U.S. Application Data

(60) Provisional application No. 61/867,560, filed on Aug. 19, 2013.

(51) Int. Cl.
*G02B 27/01*    (2006.01)
*G06F 3/01*    (2006.01)
(Continued)

(52) U.S. Cl.
CPC .......... *G02B 27/017* (2013.01); *G06F 3/013* (2013.01); *G06F 3/016* (2013.01); *G06F 3/017* (2013.01);
(Continued)

(58) Field of Classification Search
CPC .......... G02B 27/017; G02B 2027/0187; G02B 2027/014; G02B 2027/0178;
(Continued)

(56) References Cited

U.S. PATENT DOCUMENTS

| 4,698,625 A | * | 10/1987 | McCaskill | .......... | G06F 3/04845 345/157 |
| 5,565,888 A | * | 10/1996 | Selker | ................. | G06F 3/04895 715/823 |

(Continued)

FOREIGN PATENT DOCUMENTS

EP    2211260 A2    7/2010

OTHER PUBLICATIONS

International Search Report and Written Opinion—PCT/US2014/051546—ISA/EPO—dated Nov. 5, 2014.

(Continued)

*Primary Examiner* — Grant Sitta
(74) *Attorney, Agent, or Firm* — QUALCOMM Incorporated

(57) ABSTRACT

A method, an apparatus, and a computer program product provide feedback to a user of an augmented reality (AR) device having an optical see-through head mounted display (HMD). The apparatus obtains a location on the HMD corresponding to a user interaction with an object displayed on the HMD. The object may be an icon on the HMD and the user interaction may be an attempt by the user to select the icon through an eye gaze or gesture. The apparatus determines whether a spatial relationship between the location of user interaction and the object satisfies a criterion, and outputs a sensory indication, e.g., visual display, sound, vibration, when the criterion is satisfied. The apparatus may be configured to output a sensory indication when user interaction is successful, e.g., the icon was selected. Alter- (Continued)

natively, the apparatus may be configured to output a sensory indication when the user interaction fails.

25 Claims, 9 Drawing Sheets

(51) Int. Cl.
| | |
|---|---|
| *G06T 19/00* | (2011.01) |
| *G06F 3/03* | (2006.01) |
| *G06K 9/00* | (2006.01) |

(52) U.S. Cl.
CPC ....... *G06F 3/0304* (2013.01); *G06K 9/00671* (2013.01); *G06T 19/006* (2013.01); *G02B 2027/014* (2013.01); *G02B 2027/0178* (2013.01); *G02B 2027/0187* (2013.01)

(58) Field of Classification Search
CPC .... G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G06F 3/013; G06F 3/0304; G06F 3/016; G06F 3/017; G06F 3/012; G06F 345/07; G06K 9/00671; G06T 19/006
USPC .......................... 345/8, 156–173, 7; 715/700
See application file for complete search history.

(56) References Cited

U.S. PATENT DOCUMENTS

| | | | | |
|---|---|---|---|---|
| 5,757,358 A * | 5/1998 | Osga | ................... | G06F 3/04842 345/157 |
| 5,912,721 A * | 6/1999 | Yamaguchi | .......... | G06K 9/0061 351/209 |
| 6,040,824 A * | 3/2000 | Maekawa | .......... | G01C 21/3614 345/173 |
| 6,259,436 B1 * | 7/2001 | Moon | ................... | G06F 3/0488 345/173 |
| 6,323,884 B1 * | 11/2001 | Bird | ................... | G06F 3/04812 715/810 |
| 6,374,272 B2 * | 4/2002 | Bates | ....................... | G06F 3/038 715/207 |
| 6,456,262 B1 * | 9/2002 | Bell | ............................... | 345/8 |
| 6,478,425 B2 * | 11/2002 | Trajkovic | ............... | G02B 7/102 351/209 |
| 6,577,329 B1 * | 6/2003 | Flickner et al. | .............. | 715/774 |
| 6,637,883 B1 * | 10/2003 | Tengshe | ................ | A61B 3/113 351/210 |
| 7,657,062 B2 * | 2/2010 | Pilu | ........................ | A61B 3/113 345/8 |
| 7,952,566 B2 * | 5/2011 | Poupyrev | ............ | G06F 3/03547 345/173 |
| 8,072,439 B2 * | 12/2011 | Hillis | ................. | G06F 3/04883 178/18.01 |
| 8,360,578 B2 * | 1/2013 | Nummela | .................... | 351/209 |
| 8,483,768 B2 * | 7/2013 | Kim | ....................... | G06F 3/041 455/566 |
| 8,560,976 B1 * | 10/2013 | Kim | ............... | 715/863 |
| 8,593,375 B2 * | 11/2013 | Maltz | ..................... | G06F 3/013 345/8 |
| 8,781,794 B2 * | 7/2014 | Harrison | ................. | G06F 30/00 703/1 |
| 8,942,419 B1 * | 1/2015 | Wu | ........................ | G01S 17/06 382/103 |
| 8,957,943 B2 * | 2/2015 | Nourbakhsh | .......... | H04N 7/144 348/14.12 |
| 8,982,471 B1 * | 3/2015 | Starner | .............. | G02B 27/0172 359/630 |
| 8,989,417 B1 * | 3/2015 | Zhong | ................... | H04R 5/033 381/326 |
| 8,994,613 B1 * | 3/2015 | Johnson | ................... | G09G 5/37 345/178 |
| 9,002,020 B1 * | 4/2015 | Kim | ...................... | H04R 5/033 381/56 |
| 9,007,301 B1 * | 4/2015 | Raffle et al. | .................. | 345/156 |
| 2002/0105482 A1 * | 8/2002 | Lemelson | .............. | G06F 3/0485 345/7 |
| 2002/0171675 A1 * | 11/2002 | Fox | ...................... | G06F 3/04842 715/701 |
| 2004/0239509 A1 * | 12/2004 | Kisacanin | ................ | A61B 5/18 340/575 |
| 2005/0225723 A1 * | 10/2005 | Pilu | ........................ | A61B 3/113 351/209 |
| 2006/0061544 A1 * | 3/2006 | Min | .................... | G02B 27/0093 345/156 |
| 2006/0103591 A1 * | 5/2006 | Tanimura | .............. | G06F 1/3218 345/8 |
| 2006/0109238 A1 * | 5/2006 | Lau | ........................ | G06F 3/013 345/156 |
| 2008/0111833 A1 * | 5/2008 | Thorn | ...................... | G09G 5/00 345/690 |
| 2009/0125849 A1 | 5/2009 | Bouvin et al. | | |
| 2010/0165093 A1 * | 7/2010 | Sugio | ..................... | A61B 3/113 348/78 |
| 2011/0019874 A1 * | 1/2011 | Jarvenpaa et al. | ............ | 382/103 |
| 2011/0029918 A1 * | 2/2011 | Yoo | ........................ | G06F 3/013 715/800 |
| 2011/0254865 A1 * | 10/2011 | Yee | ........................ | G06F 3/013 345/661 |
| 2011/0310006 A1 * | 12/2011 | Edwards | ................ | A61B 3/113 345/156 |
| 2012/0019662 A1 * | 1/2012 | Maltz | ...................... | G06F 3/013 348/158 |
| 2012/0021806 A1 * | 1/2012 | Maltz | ...................... | H04W 4/20 455/566 |
| 2012/0105486 A1 * | 5/2012 | Lankford | ................ | G06F 3/013 345/661 |
| 2012/0169582 A1 * | 7/2012 | Tschirhart | .............. | G02B 27/01 345/156 |
| 2012/0272179 A1 * | 10/2012 | Stafford | .................. | G06F 3/012 715/781 |
| 2012/0293406 A1 * | 11/2012 | Park | ...................... | G06F 1/1626 345/156 |
| 2013/0050258 A1 | 2/2013 | Liu et al. | | |
| 2013/0145304 A1 * | 6/2013 | DeLuca | .................. | G06F 3/013 715/781 |
| 2013/0154918 A1 * | 6/2013 | Vaught et al. | ................. | 345/156 |
| 2013/0169560 A1 * | 7/2013 | Cederlund | .............. | G06F 3/013 345/173 |
| 2013/0178287 A1 * | 7/2013 | Yahav | ................ | G02B 27/01 463/32 |
| 2013/0187835 A1 * | 7/2013 | Vaught | ............... | G06K 9/00604 345/8 |
| 2013/0300652 A1 * | 11/2013 | Raffle | .................... | A61B 3/113 345/156 |
| 2013/0321265 A1 * | 12/2013 | Bychkov | ................ | G06F 3/013 345/156 |
| 2014/0055591 A1 * | 2/2014 | Katz | ...................... | G06F 3/013 348/78 |
| 2015/0026637 A1 * | 1/2015 | Ross | ..................... | G06F 3/0481 715/810 |
| 2015/0049201 A1 * | 2/2015 | Liu | ........................ | H04N 17/00 348/189 |
| 2016/0179205 A1 * | 6/2016 | Katz | ...................... | G06F 3/017 345/156 |

OTHER PUBLICATIONS

Toyama T. et al., "Gaze-based Online Face Learning and Recognition in Augmented Reality", Proceedings of the IUI 2013 Workshop on Interactive Machine Learning, IUI Workshop on Interactive Machine Learning, Poster Session, located at 18th International Conference on Intelligent User Interfaces, Mar. 19, 2013 (Mar. 19,

(56) References Cited

OTHER PUBLICATIONS

2013), pp. 1-3, XP055148119, Santa Monica, CA, USA Retrieved from the Internet: URL:http://www.dfki.de/web/forschung/publikationen/renameFileForDownload?filename=iui2012-ml-workshop2.pdf&file_id=uploads_1947 [retrieved on Oct. 21, 2014].

* cited by examiner

VISUAL, AUDIBLE, AND/OR HAPTIC FEEDBACK FOR OPTICAL SEE-THROUGH HEAD MOUNTED DISPLAY WITH USER INTERACTION TRACKING

CROSS-REFERENCE TO RELATED APPLICATION(S)

This application claims the benefit of U.S. Provisional Application Ser. No. 61/867,560, entitled "Visual, Audible, and/or Haptic Feedback in User Interface Design for Head Mounted Display with Eye Tracking and/or Gesture Tracking Capabilities" and filed on Aug. 19, 2013, which is expressly incorporated by reference herein in its entirety.

BACKGROUND

Field

The present disclosure relates generally to augmented reality (AR) devices, e.g., AR eyeglasses, having optical see-through head mounted displays (HMD) and eye tracking capability, and more particularly, to providing feedback to a user of such AR devices. AR is a technology in which a user's view of the real world is enhanced with additional information generated from a computer model. The enhancements may include labels, 3D rendered models, or shading and illumination changes. AR allows a user to work with and examine the physical real world, while receiving additional information about the objects in it.

Background

AR devices typically include an optical see-through HMD and one or more user input mechanisms that allow users to simultaneously see and interact with their surroundings while interacting with applications, such as e-mail and media players. User input mechanisms may include one or more of gesture recognition technology, eye tracking technology, and other similar mechanisms.

AR devices with eye tracking capability may provide for visual activation of applications and selection of files and documents, wherein activation or selection occurs when a user is looking at a displayed object corresponding to the application, file or document. In such AR devices, the displayed object, e.g., application icon, is displayed at a coordinate location of the HMD, while the location on the HMD at which a user is looking or gazing is determined using eye tracking technology. The determined eye gaze location is identified by coordinates of the HMD and may be displayed on the HMD as a point. When the eye gaze coordinates of the user are within range of the displayed object, i.e., either at or sufficiently near the coordinates of the displayed object, activation or selection of the displayed object occurs.

Effective implementation of visual activation of applications and selection of files and documents through eye tracking necessarily depends on the accuracy of the eye tracking technology. Eye tracking accuracy varies depending on environmental factors, such as light conditions, and user factors, such as eye shape and nose height. In cases where eye tracking is inaccurate, the eye gaze location or point determined by the eye tracking technology may not correspond to the location where the user is looking. Accordingly, although a user may be looking at an application icon on the HMD in an attempt to launch the application, the AR device does not recognize the attempt because the eye gaze coordinate output by the eye tracking technology is not within range of the icon.

SUMMARY

In an aspect of the disclosure, a method, an apparatus, and a computer program product provide feedback to a user of an augmented reality (AR) device having an optical see-through head mounted display (HMD). The apparatus obtains a location on the HMD corresponding to a user interaction with an object displayed on the HMD. The object may be an icon on the HMD and the user interaction may be an attempt by the user to select the icon through an eye gaze or gesture. The apparatus determines whether a spatial relationship between the location of user interaction and the object satisfies a criterion, and outputs a sensory indication, e.g., visual display, sound, vibration, when the criterion is satisfied. The apparatus may be configured to output a sensory indication when user interaction is successful, e.g., the icon was selected. Alternatively, the apparatus may be configured to output a sensory indication when the user interaction fails.

DETAILED DESCRIPTION

Figure 1:
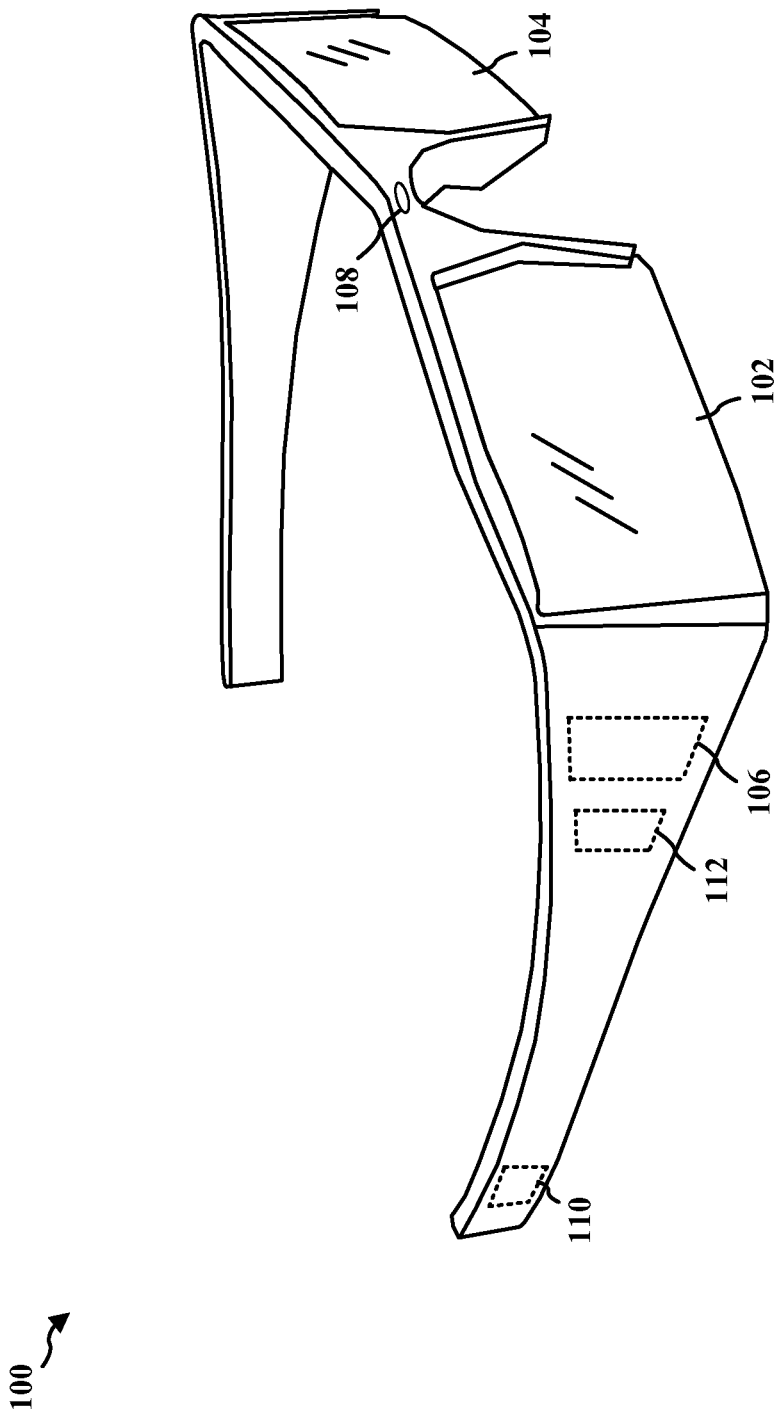
FIG. 1 is an illustration of an AR device in the form of a pair of eyeglasses.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of providing feedback to a user of an augmented reality (AR) device having an optical see-through head mounted display (HMD) will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is an illustration of an example AR device 100 in the form of a pair of eyeglasses. The AR device 100 is configured such that the user of the device is able to view real-world scenes through optical see-through HMDs together with content displayed on the HMDs, including both two-dimensional (2D) and three-dimensional (3D) AR content. The AR device 100 may also be configured to allow the user to interact with the content and possibly with remote devices, systems or networks through wireless communication. The AR device may also provide feedback to the user as a result of such interactions, including for example, audio, video or tactile feedback. To these ends, the example AR device 100 includes a pair of optical see-through HMDs 102, 104, an on-board processing system 106, one or more sensors, such as a scene camera 108, one or more eye tracking components (not visible) for each of the right eye and left eye, one or more user-interaction feedback devices 110 and a transceiver 112.

The processing system 106 and the eye tracking components provide eye tracking capability. Depending on the eye tracking technology being employed, eye tracking components may include one or both of eye cameras and infra-red emitters, e.g. diodes. The processing system 106 and the scene camera 108 provide gesture tracking capability.

The feedback devices 110 provide perception feedback to the user in response to certain interactions with the AR device. Feedback devices 110 may include a speaker or a vibration device. Perception feedback may also be provided by visual indication through the HMD.

The transceiver 112 facilitates wireless communication between the processing system 106 and remote devices, systems or networks. For example, the AR device may communicate with remote servers through the transceiver 112 for purposes of remote processing, such as on-line searches through remote search engines.

Figure 2:
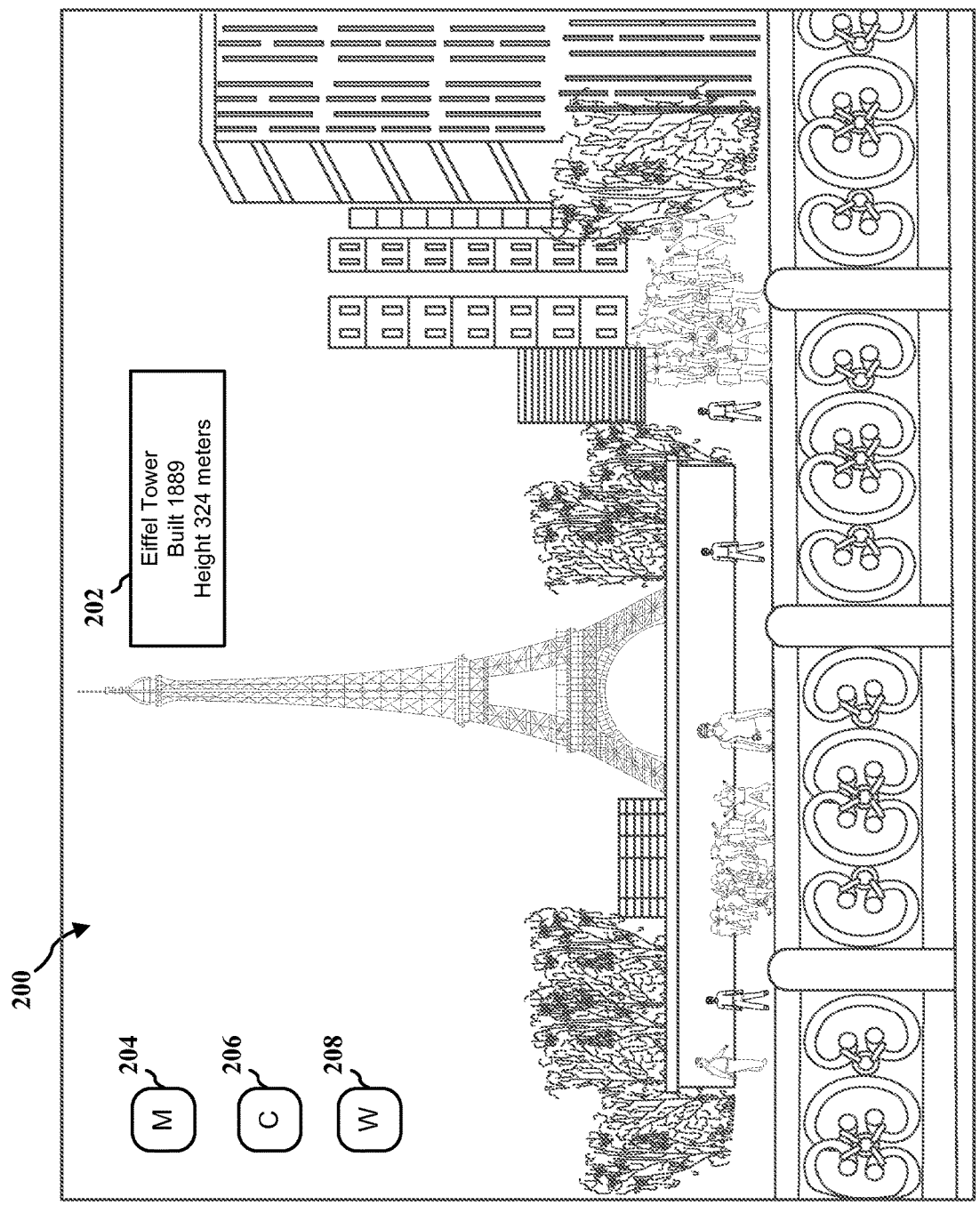
FIG. 2 is an illustration of a real-world scene through an optical see-through HMD with augmented reality.

As mention above, the AR device 100 allows a user to view real-world scenes through optical see-through HMDs together with content displayed on the HMDs. For example, with reference to FIG. 2, as a user is viewing a real-world scene 200 through the optical see-through HMDs 102, 104, the scene camera 108 may capture an image of the scene and send the image to the on-board processing system 106. The processing system 106 may process the image and output AR content 202 for display on the HMDs 102, 104. The content 202 may provide information describing what the user is seeing. In some cases, the processing system 106 may transmit the image through the transceiver 112 to a remote processor (not shown) for processing. The processing system 106 may also display one or more application icons 204, 206, 208 on the HMDs 102, 104 and output application content, such as e-mails, documents, web pages, or media content such as video games, movies or electronic books, in response to user interaction with the icons.

User interaction with the AR device 100 is provided by one or more user input mechanisms, such as a gesture tracking module or an eye-gaze tracking module. Gesture tracking is provided by the scene camera 108 in conjunction with a gesture tracking module of the processing system 106. With gesture tracking, a user may attempt to activate an application by placing his finger on an application icon 204, 206, 208 in the field of view of the AR device. The scene camera 108 captures an image of the finger and sends the image to the gesture tracking module. The gesture tracking module processes the image and determines coordinates of a gesture point corresponding to where the user is pointing. The processing system 106 compares the coordinate location of the gesture point to the coordinate location of the icon on the display. If the locations match, or are within a threshold distance of each other, the processing system 106 determines that the user has selected the icon 204, 206, 208 and accordingly, launches the application.

Eye-gaze tracking is provided by the eye tracking components (not visible) in conjunction with an eye tracking module of the processing system 106. A user may attempt to activate an application by gazing at an application icon 204, 206, 208 in the field of view of the AR device. The eye tracking components capture images of the eyes, and provide the images to the eye tracking module. The eye tracking module processes the images and determines coordinates of an eye-gaze point corresponding to where the user is looking. The processing system 106 compares the coordinate location of the eye-gaze point to the coordinate location of the icon on the display. If the locations match, or are within a threshold distance of each other, the processing system 106 determines that the user has selected the icon 204, 206, 208 and accordingly, launches the application. Often, such eye-gaze based launching is coupled with another form of input, e.g., gesture, to confirm the user's intention of launching the application.

Figure 3:
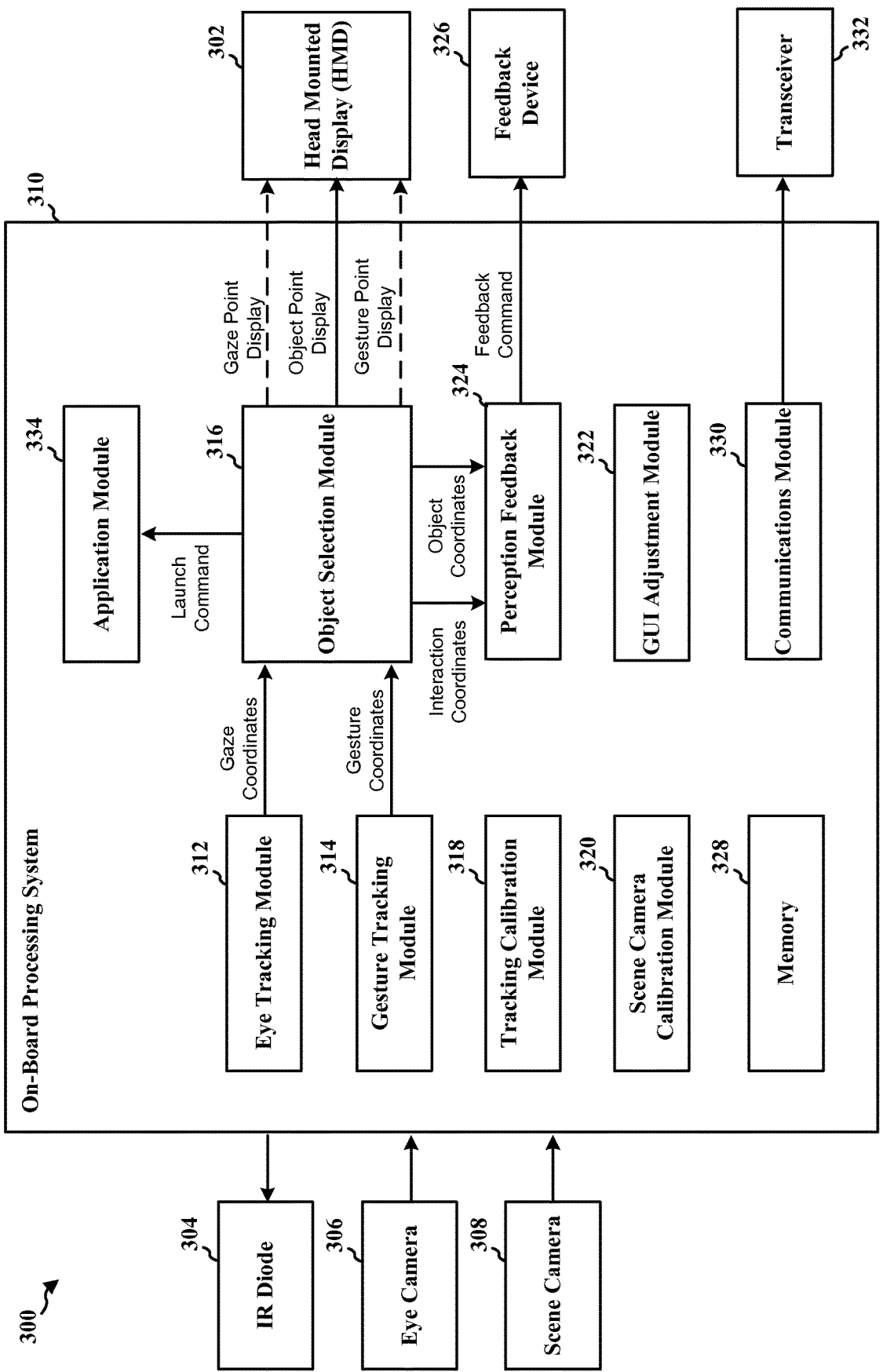
FIG. 3 is a diagram illustrating elements of an AR device.

FIG. 3 is a diagram illustrating elements of an example AR device 300 with optical see-through HMDs 302. The AR device 300 may include one or more sensing devices, such as infrared (IR) diodes 304 facing toward the wearer of the AR device and eye cameras 306 facing toward the wearer. A scene camera 308 facing away from the wearer captures images of the field of view seen by the user through the HMD 302. The cameras 306, 308 may be video cameras. While only one IR diode 304 and one eye camera 306 are illustrated, the AR device 300 typically includes several diodes and cameras for each of the left eye and right eye. A single scene camera 308 is usually sufficient. For ease of illustration only one of each sensor type is shown in FIG. 3.

The AR device 300 includes an on-board processing system 310, which in turn includes one or more of an eye tracking module 312 and a gesture tracking module 314. As described further below, an object selection module 316 processes the outputs of the one or more tracking modules to determine user interactions and tracking module accuracy. A tracking calibration module 318 calibrates the one or more tracking modules if the tracking module is determined to be inaccurate.

The on-board processing system 310 may also include a scene camera calibration module 320, a graphical user interface (GUI) adjustment module 322, and a perception feedback module 324. The scene camera calibration module 320 calibrates the AR device so that the AR content is aligned with real world objects. The GUI adjustment module 322 may adjust the outputs of the eye tracking module 312 or the gesture tracking module 314 to compensate for inaccuracies detected by the object selection module 316. Such adjustments may precede, supplement, or substitute for the actions of the tracking calibration module 318. The feedback module 324 controls one or more feedback devices 326 to provide perception feedback to the user in response to one or more types of user interactions. For example, the feedback module may command a feedback device 326 to output sound when a user selects an icon in the field of view using a gesture or eye gaze.

The AR device 300 further includes memory 328 for storing program code to implement the foregoing features of the on-board processing system 310. A communications module 330 and transceiver 332 facilitate wireless communications with remote devices, systems and networks. For example, in one implementation, an image of a real-world object may be captured by the scene camera 308 and transmitted by the communications module 330 and the transceiver 332 to a remote search engine, with subsequent search results being received by the transceiver.

With further respect to eye tracking capability, the diodes 304 and eye cameras 306, together with the eye tracking module 312, provide eye tracking capability as generally described above. In the example implementation of FIG. 3, the eye tracking capability is based on known infrared technology. One such known technology uses infrared light emitting diodes and infrared sensitive video camera for remotely recording images of the eye. Infrared light output by the diode 304 enters the eye and is absorbed and re-emitted by the retina, thereby causing a "bright eye effect" that makes the pupil brighter than the rest of the eye. The infrared light also gives rise to an even brighter small glint that is formed on the surface of the cornea. The eye tracking module 312 acquires a video image of the eye from the eye camera 306, digitizes it into a matrix of pixels, and then analyzes the matrix to identify the location of the pupil's center relative to the glint's center, as well as a vector between these centers. Based on the determined vector, the eye tracking module 312 outputs eye gaze coordinates defining an eye gaze point (E).

The scene camera 308, together with the gesture tracking module 314, provide gesture tracking capability using a known technology as generally described above. In the example implementation of FIG. 3, the gesture tracking capability is based on gesture images captured by the scene camera 308. The gesture images are processed by the gesture tracking module 314 by comparing captured images to a catalog of images to determine if there is a match. For example, the user may be pointing at an icon in the field of view. The gesture tracking module 312 may detect a match between the gesture image and a cataloged image of pointing and thereby recognize the gesture as pointing. Upon detection of a recognized gesture, the gesture tracking module 314 processes the captured image further to determine the coordinates of a relevant part of the gesture image. In the case of finger pointing, the relevant part of the image may correspond to the tip of the finger. The gesture tracking module 314 outputs gesture coordinates defining a gesture point (G).

The object selection processor 316 functions to determine whether interactions of the user, as characterized by one or more of the eye tracking module 312 and the gesture tracking module 314, correspond to a selection of an object, e.g., application icon, displayed on the HMD 302 and visible in the field of view. If an interaction does correspond to a selection by the user, for example, a selection of an icon to launch an application 334, the object selection processor 316 outputs a command to the application.

With respect to object selection based on eye gaze, the object selection processor 316 receives eye gaze coordinates representing an eye gaze point (E) from the eye tracking module 312. In one configuration, the eye gaze coordinates output by the eye tracking module 312 are with respect to the origin and direction of an eye coordinate system. The eye coordinate system is defined by the eye tracking module 312 and usually has an origin corresponding to the center of the user's respective right or left eye. In this configuration, the object selection processor 316 transforms the eye gaze coordinates to a screen coordinate system, and optionally outputs the transformed eye gaze coordinates as an eye gaze point (E) for display on the HMD. The screen coordinate system is defined by the HMD and usually has an origin corresponding to the center of the respective right or left HMD. In another configuration, the transformation of the eye gaze coordinate to the screen coordinate system of the HMD may be performed by the eye tracking module 306.

The object selection processor 316 compares the eye gaze coordinates of eye gaze point (E) to the object coordinates of an object point (P), for example, by determining the distance between the point (E) and point (P). The object point (P) may correspond to the center of an application icon displayed on the HMD. If the eye gaze point (E) is determined to be at or near the object point (P), then the object selection processor 316 determines that a selection has occurred, and an appropriate action follows. For example, if the object point (P) represents and application icon, the command may open the application.

With respect to object selection based on gesture, the object selection processor 316 receives gesture coordinates representing a gesture point (G) from the gesture tracking module 314. In one configuration, the gesture coordinates output by the gesture tracking module 314 are with respect to the origin and direction of gesture coordinate system. The gesture coordinate system is defined by the gesture tracking module 314 and usually has an origin corresponding to the center of the scene camera 308. In this configuration, the object selection processor 316 transforms the gesture coordinates to a screen coordinate system, and optionally outputs the transformed gesture coordinates as gesture point (G) for display on the HMD. The screen coordinate system is defined by the HMD and usually has an origin corresponding to the center of the respective right or left HMD. In another configuration, the transformation of the gesture coordinate to the screen coordinate system of the HMD may be performed by the gesture tracking module 314.

The object selection processor 316 compares the gesture coordinates of gesture point (G) to the object coordinates of an object point (P), for example, by determining the distance between the point (G) and point (P). The object point (P) may correspond to the center of an application icon displayed on the HMD. If the gesture point (G) is determined to be at or near the object point (P), then the object selection processor 316 determines that a selection has occurred, and an appropriate action follows. For example, if the object point (P) represents an application icon, the command may open the application.

As mentioned above, the accuracy of eye tracking technology varies depending on environmental factors, such as light conditions, and user factors, such as eye shape and nose height. Inaccurate eye tracking may result in poor user experience in that a user's attempt to activate an application may go undetected by the processing system 106.

Figure 4:
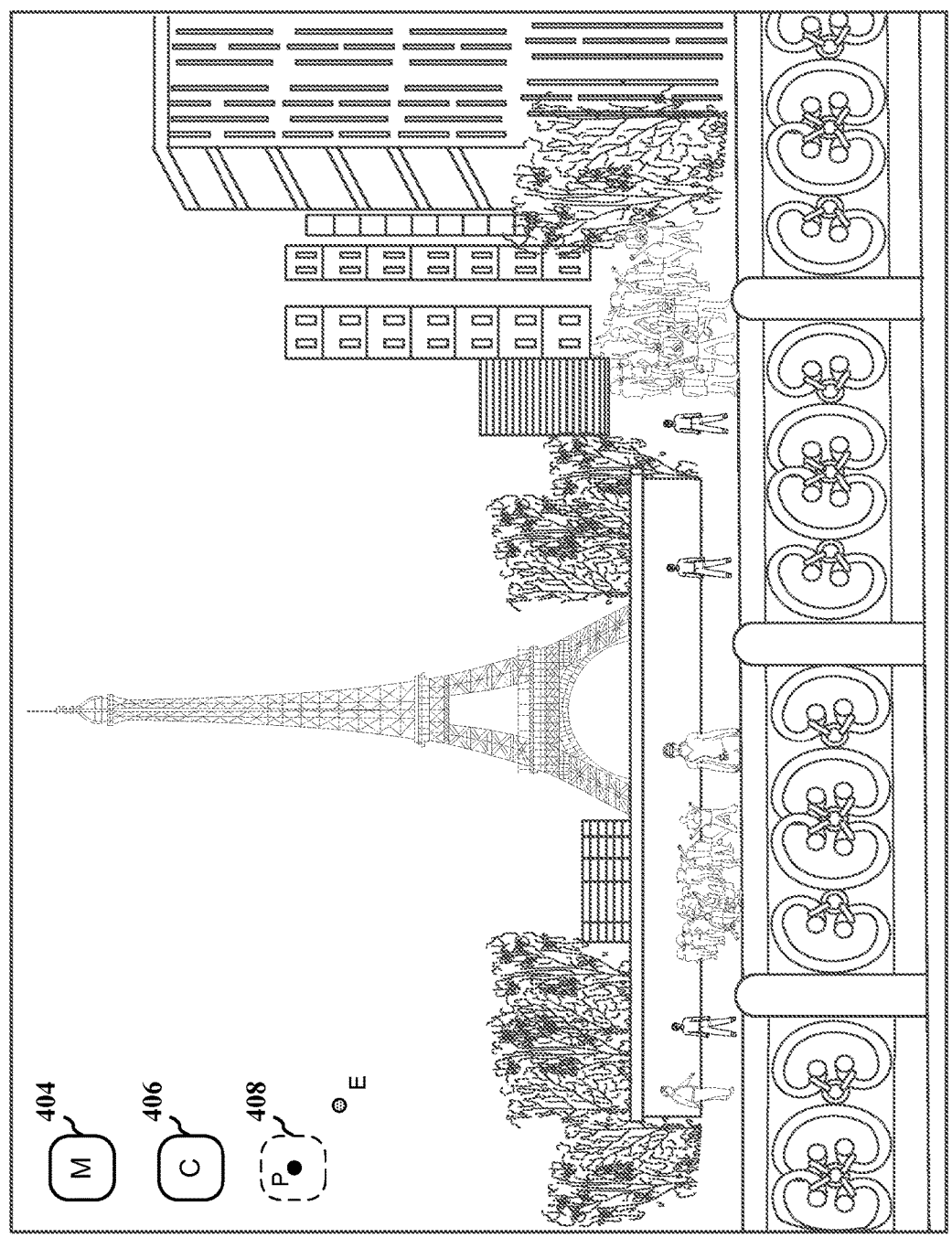
FIG. 4 is an illustration of an HMD scene with inaccurate eye tracking, wherein a reported eye-gaze coordinate is offset from a user's actual gaze.

FIG. 4 is an illustration of an instance of inaccurate eye tracking. Here, the user is attempting to activate the application associated with an icon 408 by staring at the icon. The eye tracking module 310, however, outputs an eye-gaze point (E) having a location that does not match, nor fall within a threshold distance of, the object point (P) representing the icon 408. Because the user's eye gaze is not touching or sufficiently close to the icon, the AR device does not recognize the user's intent and the application or document is not activated or selected by the device. To address this issue, the eye tracking module 310 may be calibrated so that the output of the eye tracking module allows the object selection processor 314 to accurately determine whether a user is selecting an object on the HMD screen.

Figure 5:
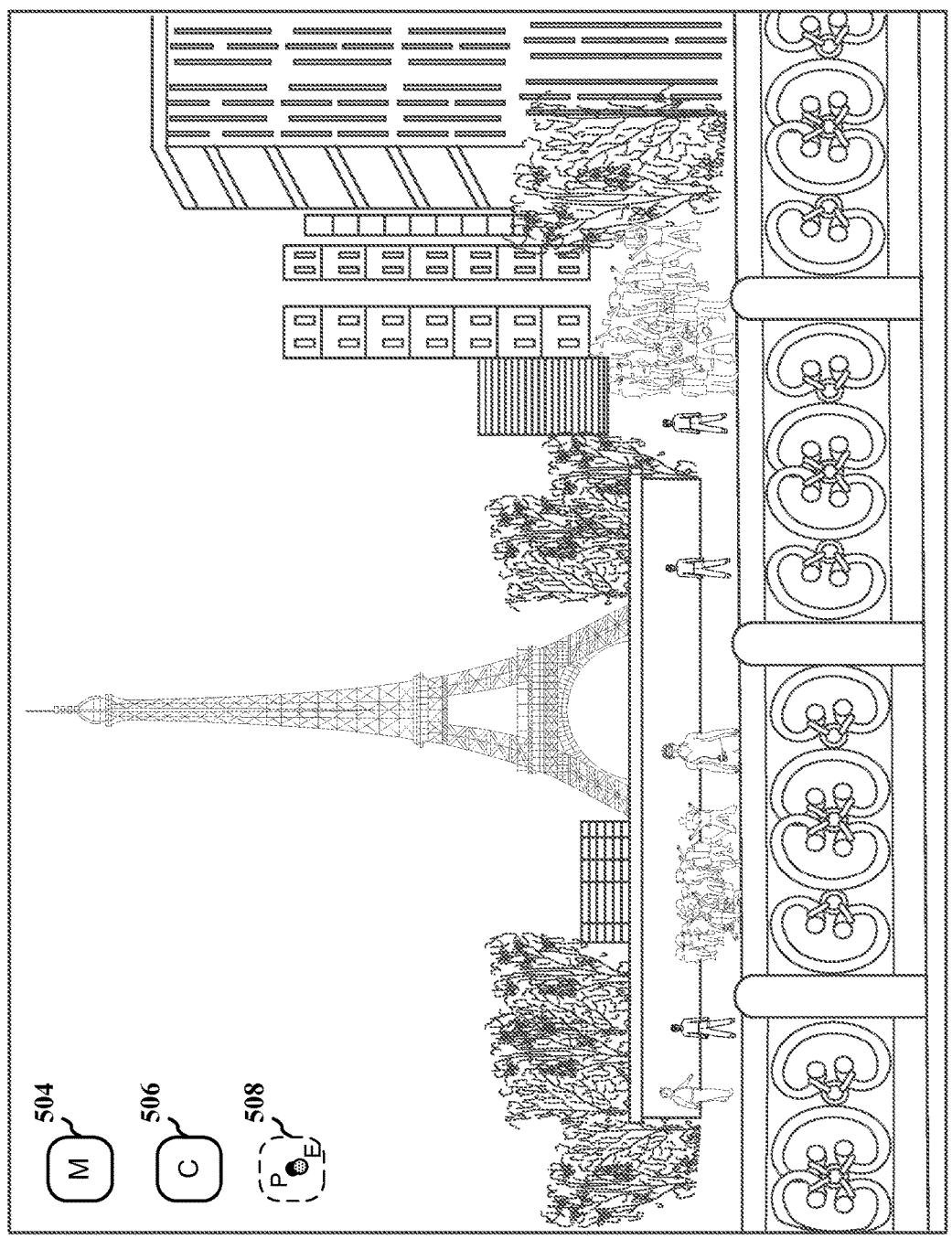
FIG. 5 is an illustration of an HMD scene with accurate eye tracking, wherein a reported eye-gaze coordinate is sufficiently aligned with a user's actual gaze.

FIG. 5 is an illustration of an instance of accurate eye tracking after calibration. During a typical calibration phase, a user is presented at least one virtual target dot (T) in the optical see-through HMD display. The user then stares into the dot (T) and initiates eye tracking calibration using some input technique, such as a gesture. The eye tracking module generates a user eye-gaze point (E) based on its model. Using coordinates of the target dot (T) and coordinates of the eye-gaze point (E), the eye tracking module adjusts its output model such that the target dot (T) and eye-gaze point (E) overlap, as shown in FIG. 5. After calibration, the AR device displays a dot corresponding to the calibrated eye-gaze point (E) along with the target dot (P) the user is looking at. This helps the user to visually determine the accuracy of the calibration process and to determine whether the accuracy acceptable. If the accuracy is not acceptable, the user may repeat the calibration process.

Prior to calibration, or even after calibration if such calibration is unsuccessful, it would be beneficial to provide a user with real-time feedback representative of user interaction with the AR device. For example, some sort of visual, sound or haptic feedback indicative of inaccurate eye-gaze tracking may allow the user to adjust his eye gaze so that the eye gaze coordinate is sufficiently close to a target so that better system/interaction performance could be achieved. This type of feedback may be referred to herein as "negative" feedback.

It may also be beneficial to provide user feedback in other instances that are unrelated to calibration and inaccurate user-interaction tracking. For example, feedback may be provided when the user's eye gaze falls within a region of interest, such as over or near an application icon. The feedback may be visual, sound or haptic and serves to indicate to the user that she is within range of selecting the icon. This type of feedback may be referred to herein as "positive" feedback. In this case, an eye-gaze dot representative of the user's eye gaze may be displayed on the HMD only when the eye-gaze is determined to be within range of the icon. Limiting eye-gaze dot display in this manner enhances user experience and conserves AR device power.

While the foregoing has focused on eye gazing as a means of activating or selecting an icon, the negative and positive feedback methods and apparatuses disclosed herein may be applied to gesture based activations and selections. In this case, a user may attempt to select an icon by pointing a finger in space in the direction of the icon. Positive feedback may be provided when the pointing is determined to be within a region of interest. Negative feedback may be provided when the pointing is determined to lie outside the region of interest. In this case, the user may adjust his gestures accordingly so as to achieve the desired result, e.g., icon selection.

Figure 6:
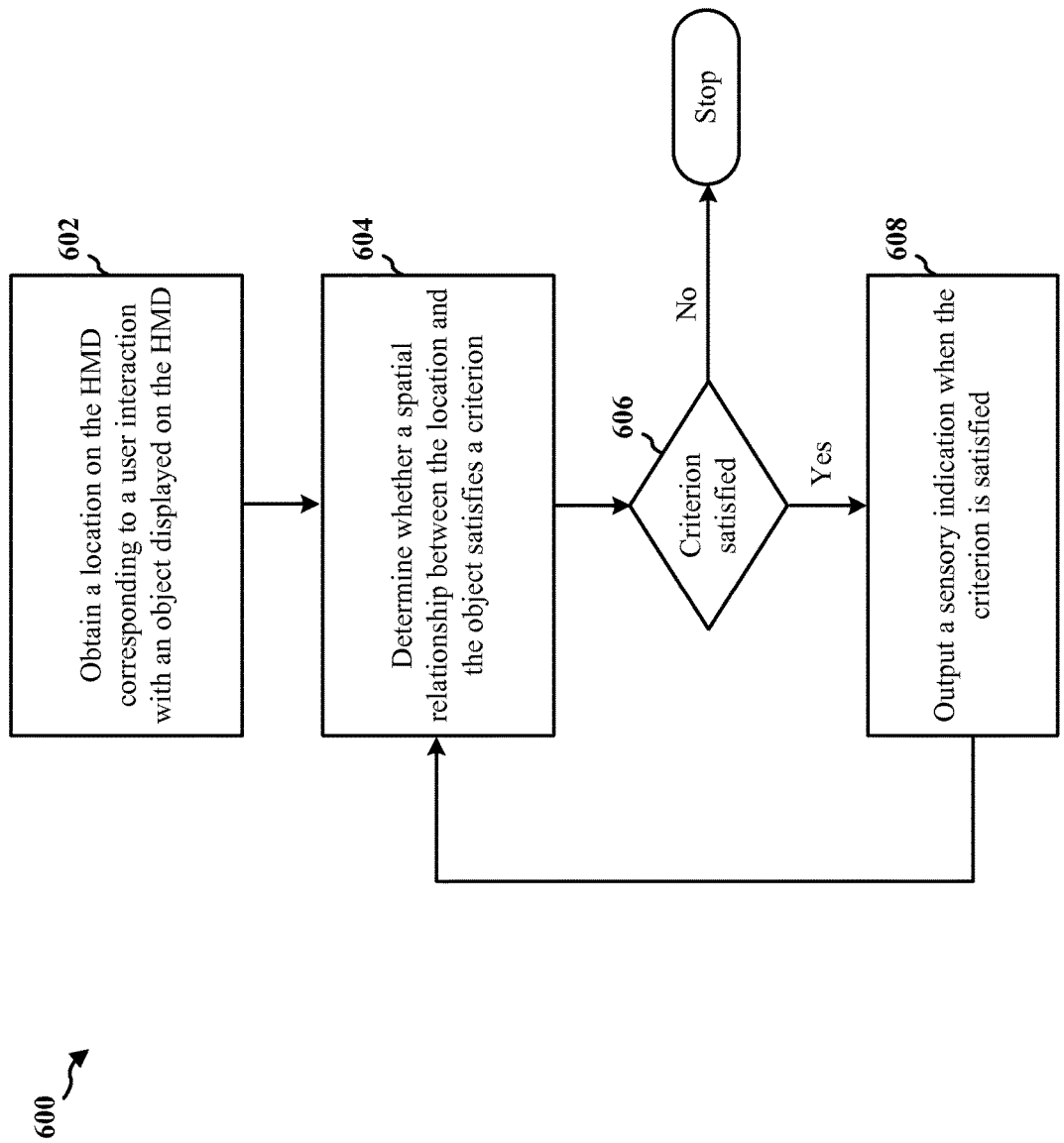
FIG. 6 is a flow chart of a method of providing feedback to a user of an augmented reality (AR) device having an optical see-through head mounted display (HMD).

FIG. 6 is a flowchart of a method providing feedback to a user of an AR device having an optical see-through HMD. The method may be performed by an AR device. In step 602, the AR device obtains a location on the HMD corresponding to a user interaction with an object displayed on the HMD. The object displayed on the HMD may be an icon. In one configuration, the user interaction may be an eye gaze, in which case the AR device obtains a location on the HMD by obtaining data corresponding to the location from an eye tracking system that tracks user eye gaze. The eye tracking system may be the eye tracking module 312 and the data corresponding to the location may be coordinates of the HMD screen. In another configuration, the user interaction may be a gesture, in which case the AR device obtains a location on the HMD by obtaining data corresponding to the location from a gesture tracking system that tracks user gestures. The gesture tracking system may be the gesture tracking module 314.

At step 604, the AR device determines whether a spatial relationship between the location and the object satisfies a criterion. As described above, the location may be defined by a location point on the HMD, such as coordinate points of the HMD screen.

At step 606, the AR device determines if the criterion is satisfied. The AR device determines whether the criterion is satisfied by obtaining data corresponding to an object point of the object on the HMD. The object point may be, for example, a center point of the object. The data corresponding to the object point may also be coordinates of the HMD screen.

Once the data for each of the location point and the object point is determined or obtained, the AR device determines a spatial relationship between the location point and the object point. In one configuration, the spatial relationship is the distance between the two points and the criterion is satisfied, in the case of negative feedback, when the distance is greater than a threshold amount, or in the case of positive feedback, when the distance is less than a threshold amount. In another configuration, the AR device determines data corresponding to a boundary around the object or object point. The boundary may be a geometric shape, e.g., circle, defined relative to the center of the object. In the case of positive feedback, the criterion is satisfied when the distance is such that the location point lies within the boundary. In the case of negative feedback, the criterion is satisfied when the distance is such that the location point lies outside the boundary.

If the AR device determines that the criterion is not satisfied, the process stops. If the criterion is satisfied, then at step 608, the AR device outputs a sensory indication. The sensory indication may be one or more of a visual indication, an auditory indication or a haptic indication.

Figure 7B:
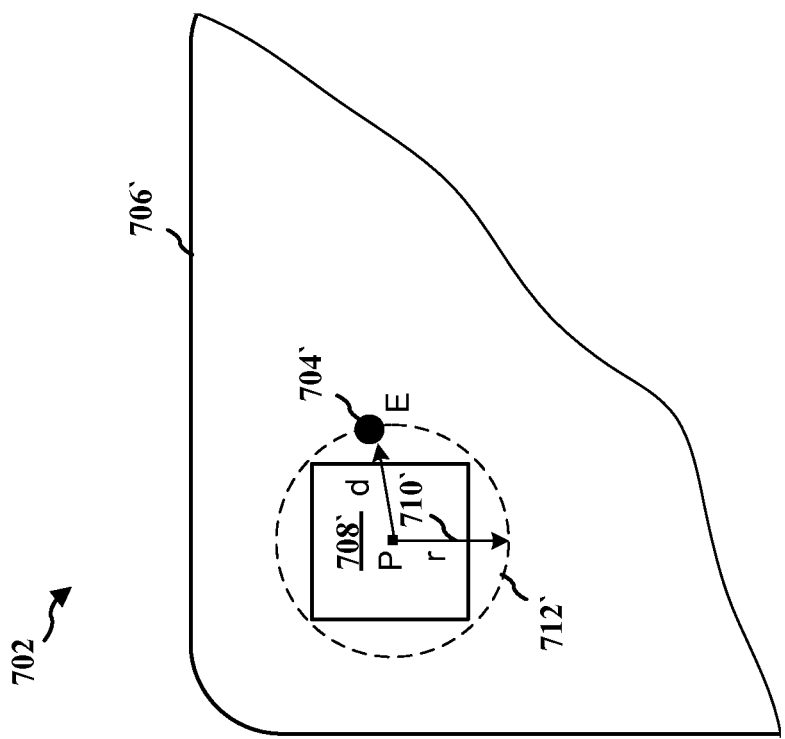
FIG. 7B is an illustration of a region of an HMD screen showing a spatial relationship between a user-initiated location point (E) and an object on the HMD, wherein the location point is within range of the object to initiate interaction with the AR device.
Figure 7A:
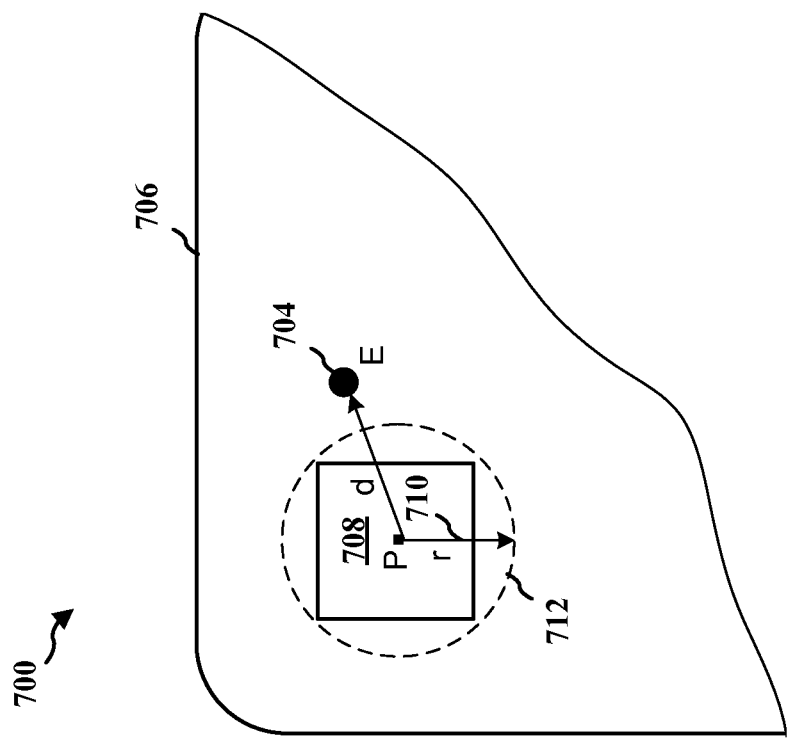
FIG. 7A is an illustration of a region of an HMD screen showing a spatial relationship between a user-initiated location point (E) and an object on the HMD, wherein the location point is too distant from the object to initiate interaction with the AR device.

FIG. 7A is an illustration of a region 700 of an HMD screen showing a spatial relationship between a user-initiated location point (E) and an object on the HMD, wherein the location point is too distant from the object to initiate interaction with the AR device. An eye gaze object 704 corresponding to a location point (E) on the HMD 706 where a user is determined to be looking by an eye tracking module is displayed on the HMD. An object or screen image 708 corresponding to, for example, an application icon is also displayed on the HMD 706. The object 708 has an object point (P) that may be the center of the object. A threshold distance 710 is associated with the screen image, and may be defined, for example, by a radius (r) measured from the object point (P) and defining a circle bounding the screen image 708.

In the instance illustrated in FIG. 7A, and in the case of a negative feedback configuration, the perception feedback module 324 determines that the eye gaze object (E) satisfies the criterion because the eye-gaze object 704 lies outside the boundary 712. Accordingly, the feedback module 326 outputs a sensory indication. As previously describer, the sensory indication may include one or more of a visual indicator that appears on the HMD display, such as the eye gaze object 704, an auditory indicator that outputs a sound, or a haptic indicator that causes the user to sense vibration.

Thus, in the case of negative feedback, the AR device provides a way for the user of an AR device to realize the offset between his eye gaze (E) and a target object 708, which may be due to inaccuracy of the eye tracking system. With this knowledge, the user may adjust his eye gaze accordingly to hit the target. For example, with reference to FIG. 7A, if the eye gaze coordinate 704 is displayed on the screen to the right of the target icon 708, the user may adjust his eye gaze by looking to the left of the target icon so that the eye gaze coordinate 704 falls within the boundary to thereby activate the program associated with the icon.

FIG. 7B is an illustration of a region 702 of an HMD screen showing a spatial relationship between a user-initiated location point (E) and an object on the HMD, wherein the location point is within range of the object to initiate interaction with the AR device. An eye gaze object 704' corresponding to a location point (E) on the HMD 706' where a user is determined to be looking by an eye tracking module is displayed on the HMD. An object or screen image 708' corresponding to, for example, an application icon is also displayed on the HMD 706'. The object 708' has an object point (P) that may be the center of the object. A threshold distance 710' is associated with the screen image, and may be defined, for example, by a radius (r) measured from the object point (P) and defining a circle bounding the screen image 708'.

In the instance illustrated in FIG. 7B, and in the case of a positive feedback configuration, the perception feedback module 324 determines that the eye gaze object (E) satisfies the criterion because the eye-gaze object 704' lies on or within the boundary 712'. Accordingly, the feedback module 326 outputs a sensory indication. As previously describer, the sensory indication may include one or more of a visual indicator that appears on the HMD display, such as the eye gaze object 704, an auditory indicator that outputs a sound, or a haptic indicator that causes the user to sense vibration. Thus, in the case of positive feedback, the AR device provides a way for the user of an AR device to realize her attempt to initiate interaction with the AR device is successful.

In one configuration, either positive or negative feedback is in the form of sound or vibration, as opposed visual. This may be beneficial in that it reduces the number of objects on the display, which correspondingly reduces user distraction and provides for a better user experience. Reducing the number of objects displayed also conserves device energy.

Figure 8:
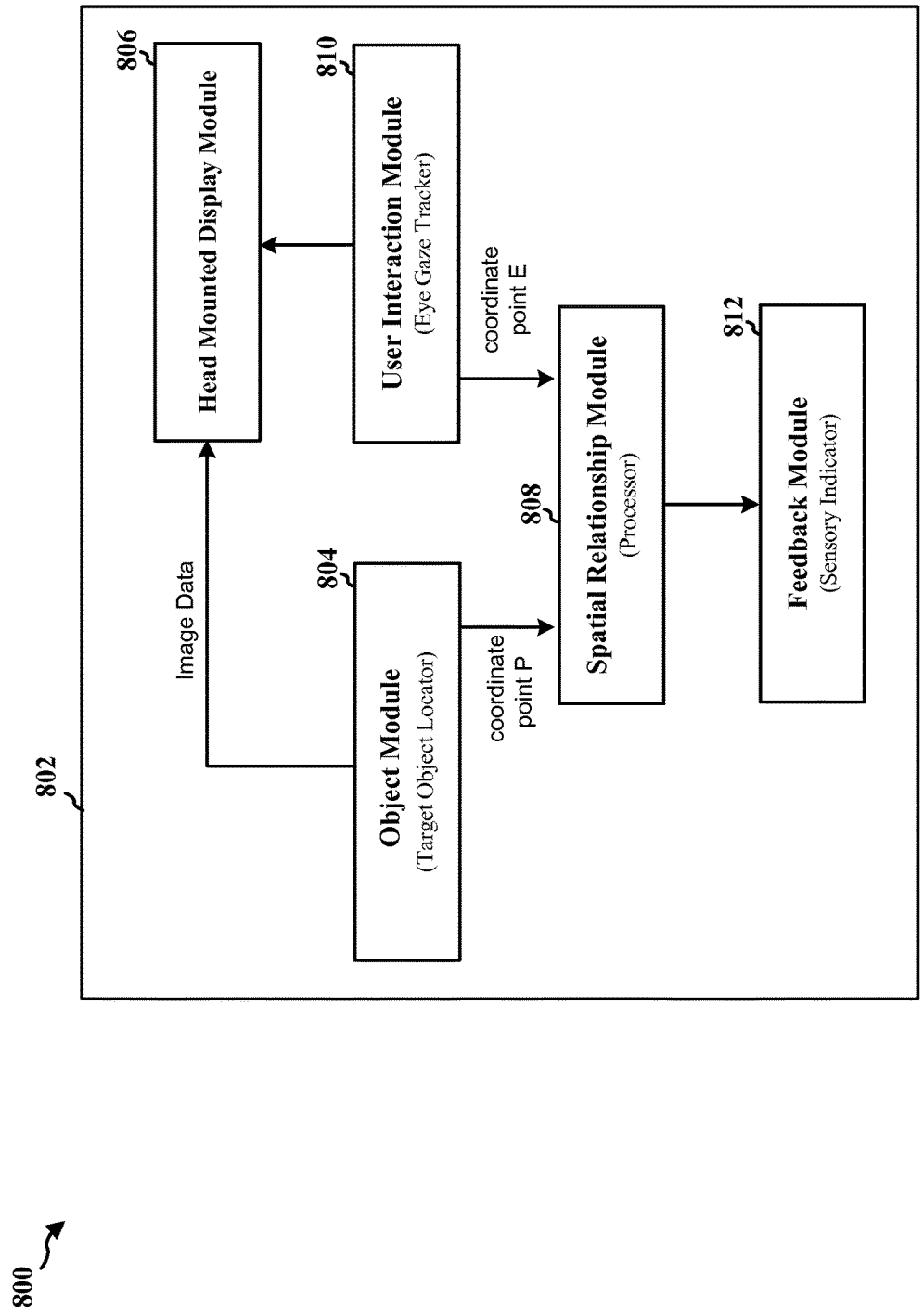
FIG. 8 is a diagram illustrating elements of an AR device that provides feedback to a user of an AR device having an optical see-through HMD.

FIG. 8 is a diagram 800 illustrating elements of an AR device 802 that provides feedback to a user of an AR device having an optical see-through HMD. The AR device 802 includes an object module 804, a HMD module 806, a spatial relationship module 808, a user interaction module 810 and a feedback module 812. These modules may be referred to by different names, as indicated parenthetically, and may correspond to one or more of the modules of FIG. 3. For example, the object module 804 may be part of the object selection module 316, the spatial relationship module 808 may be part of the perception feedback module 324, the feedback module 812 may be the feedback device 326, and the user interaction module 810 may be the eye tracking module 312 or the gesture tracking module 314.

The object module 804 provides data corresponding to the position of an object displayed on the HMD. The data may include image data that is provided to the HMD 806 in order to display the object 708 on the HMD. The data also includes coordinate data that defines the object point (P) of the object 708 in terms of the coordinate system corresponding to the HMD screen. The coordinate data for the object point (P) is provided to the spatial relationship module 808.

The spatial relationship module 808 obtains a location on the HMD corresponding to a user interaction with the object 708 displayed on the HMD. The location is obtained from the user interaction module 810. The user interaction may be an eye gaze, in which case the user interaction module 810 is an eye tracking module that tracks user eye gaze and outputs data corresponding to the location. The user interaction may be gesture, in which case the user interaction module 810 is a gesture tracking module that tracks user gestures and outputs data corresponding to the location. In either case, the location data includes coordinate data that defines the location point (E) of the user interaction in terms of the coordinate system corresponding to the HMD screen.

The spatial relationship module 808 determines whether a spatial relationship between the location and the object satisfies a criterion and the feedback module 812 outputs a sensory indication when the criterion is satisfied. The determination of whether the criterion is satisfied is based on the coordinate data (P) of the object and the coordinate data (E)

of the user interaction. In one configuration, the coordinate data (P) of the object may be used to define a boundary around the object, and the criterion is satisfied depending on whether the coordinate data (E) of the user interaction falls within or outside of the boundary and on whether the AR device is configured to provide positive feedback or negative feedback. For example, if configured for negative feedback, the AR device provides feedback when the coordinate data (E) is outside the boundary. If configured for positive feedback, the AR device provides feedback when the coordinate data (E) is on or within the boundary.

The AR devices, as illustrated in FIGS. 3 and 8 may include additional modules that perform each of the steps of the algorithm in the aforementioned flow chart of FIG. 6. As such, each step in the aforementioned flow chart of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
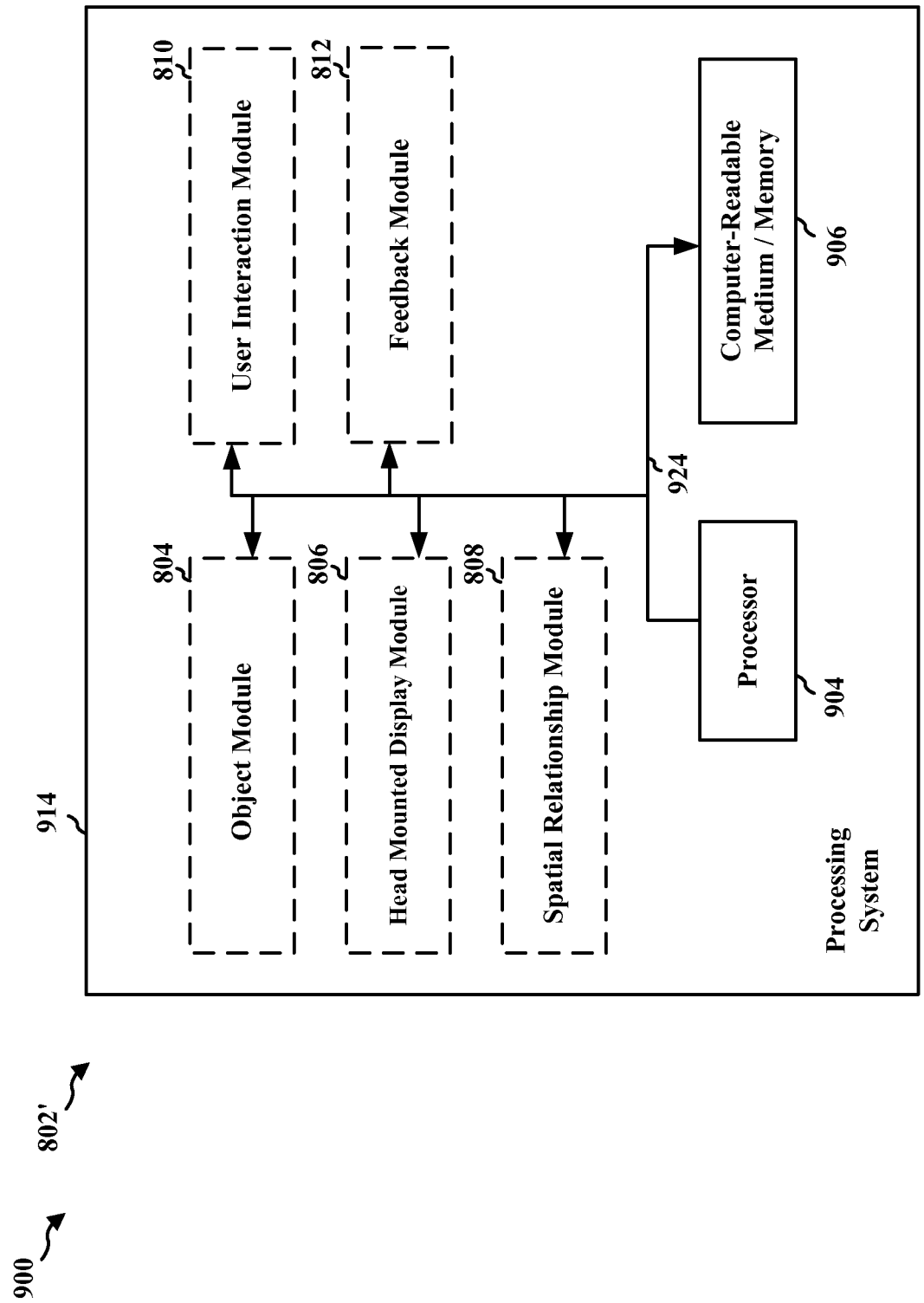
FIG. 9 is a diagram illustrating an example of a hardware implementation for an AR device employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808, 810 and 812. The modules may be software modules running in the processor 904, resident/stored in the computer readable medium/memory 906, one or more hardware modules coupled to the processor 904, or some combination thereof.

In one configuration, the apparatus 802/802' includes means for obtaining a location on the HMD corresponding to a user interaction with an object displayed on the HMD. The apparatus 802/802' also includes means for determining whether a spatial relationship between the location and the object satisfies a criterion. The apparatus 802/802' further includes means for outputting a sensory indication when the criterion is satisfied. The aforementioned means may be one or more of the aforementioned modules of the apparatus 802 and/or the processing system 914 of the apparatus 802' configured to perform the functions recited by the aforementioned means.

Returning to FIG. 8, in summary, the AR device described herein provides a visual, audible and/or haptic feedback responsive to either inaccurate tracking of user interaction, e.g., negative feedback, or accurate tracking, e.g., positive feedback, through bone conduction or other audible and/or haptic technology. For example, in the case of eye tracking, the AR device identifies an eye fixation. This may be done using known eye tracking technologies, including for example a backward facing camera on an AR device that captures the user's eye and an algorithm that tracks movement of the user's eye based on the image from the camera. The eye tracking technology provides an eye gaze coordinate with respect to the HMD screen and the AR device displays the eye-gaze coordinate on the screen.

The AR device may specify a bounding box around a target image or activation area (e.g. an icon or a button), and determine if the eye gaze is inside the box. In the case of positive feedback, if an eye gaze is detected near or inside the bounding box, the eye gaze visual feedback is displayed. For example, with reference to FIG. 7A, if the known center of an icon is P; the bounding box takes P as the center of a circle, and r as radius. The bounding box could have other specifications. The eye gaze coordinate E is displayed if distance (E, P)<=r. If with other bounding box specifications, distance (E, P)<=bounds ( ).

In an aspect of the disclosure, a method, an apparatus, and a computer program product provide an indication of tracking accuracy of user initiated interaction with a head mounted display. A method involves determining whether a user is initiating an eye fixation, and outputting a sensory and/or visual indication when an eye fixation is initiated. In this method, an eye fixation occurs when a visual eye gaze of the user is on a single location.

A corresponding apparatus for indicating tracking accuracy of user initiated interaction with a head mounted display, includes means for determining whether a user is initiating an eye fixation, and means for outputting a sensory and/or visual indication when an eye fixation is initiated. Another corresponding apparatus includes a memory, and at least one processor coupled to the memory and configured to determine whether a user is initiating an eye fixation, and output a sensory and/or visual indication when an eye fixation is initiated. A corresponding computer program product for indicating tracking accuracy of user initiated interaction with a head mounted display includes a computer-readable medium comprising code for determining whether a user is initiating an eye fixation and outputting a sensory and/or visual indication when an eye fixation is initiated.

In another aspect of the disclosure, a method, an apparatus, and a computer program product provide an indication of tracking accuracy of user initiated interaction with a head mounted display. A method involves determining whether a user initiated object on a display is within a threshold distance of a screen image displayed on the display, and outputting a sensory indication when the user initiated object is not within the threshold distance. Determining may include obtaining data corresponding to a first point of the screen image on the display, determining data corresponding to a boundary around the first point, obtaining data corresponding to a second point of the user initiated object on the display, and determining the user initiated object is within a threshold distance when the second point lies within the boundary. The first point may be the center of the screen image, and the boundary may be a circle having a radius from the center. The sensory indication may be one or more of a visual indication, an auditory indication or a haptic indication. The user initiated object may be an eye gaze object corresponding to eye gaze of the user. The user initiated object may be a gesture object corresponding to a gesture made by the user.

A corresponding apparatus for indicating tracking accuracy of user initiated interaction with a head mounted display includes means for determining whether a user initiated object on a display is within a threshold distance of a screen image displayed on the display, and means for outputting a sensory indication when the user initiated object is not within the threshold distance. The means for determining whether a user initiated object on a display is within a threshold distance of a screen image displayed on the display may be configured to obtain data corresponding to a first point of the screen image on the display, to determine data corresponding to a boundary around the first point, to obtain data corresponding to a second point of the user initiated object on the display, and to determine the user initiated object is within a threshold distance when the second point lies within the boundary.

Another corresponding apparatus includes a memory, and at least one processor coupled to the memory and configured to determine whether a user initiated object on a display is within a threshold distance of a screen image displayed on the display, and to output a sensory indication when the user initiated object is not within the threshold distance. In order to determine whether a user initiated object on a display is within a threshold distance of a screen image displayed on the display, the processor is configured to obtain data corresponding to a first point of the screen image on the display, to determine data corresponding to a boundary around the first point, to obtain data corresponding to a second point of the user initiated object on the display, and to determine the user initiated object is within a threshold distance when the second point lies within the boundary.

A corresponding computer program product for indicating tracking accuracy of user initiated interaction with a head mounted display includes a computer-readable medium comprising code for determining whether a user initiated object on a display is within a threshold distance of a screen image displayed on the display; and, code for outputting a sensory indication when the user initiated object is not within the threshold distance. The code for determining whether a user initiated object on a display is within a threshold distance of a screen image displayed on the display includes code for obtaining data corresponding to a first point of the screen image on the display, code for determining data corresponding to a boundary around the first point, code for obtaining data corresponding to a second point of the user initiated object on the display, and code for determining the user initiated object is within a threshold distance when the second point lies within the boundary.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of providing feedback to a user of a head-mounted display device having a display, comprising:
    obtaining, outside of any user interaction calibration process, a location on the display corresponding to a user interaction;
    determining a location of a point on an object displayed on the display;
    determining, outside of any user interaction calibration process, an offset, wherein the offset is associated with a distance between the location on the display corresponding to the user interaction and the location of the point on the object;
    determining, outside of any user interaction calibration process, whether the offset satisfies a criterion associated with inaccurate user interaction tracking, wherein the criterion is satisfied when the distance between the location on the display corresponding to the user interaction and the location of the point on the object is greater than a threshold, and wherein the criterion being satisfied is indicative of the inaccurate user interaction tracking; and
    outputting, outside of any user interaction calibration process, a sensory indication indicative of the inaccurate user interaction tracking when the criterion is satisfied, the sensory indication being one or more of an auditory indication or a haptic indication.

2. The method of claim 1, wherein the user interaction is an eye gaze and obtaining the location on the display comprises obtaining data corresponding to the location on the display from an eye tracking system that tracks user eye gaze.

3. The method of claim 1, wherein the user interaction is a gesture and obtaining the location on the display comprises obtaining data corresponding to the location on the display from a gesture tracking system that tracks user gestures.

4. The method of claim 1, wherein the location on the display corresponding to the user interaction is defined by a location point on the display.

5. The method of claim 4, wherein the threshold is a distance between the point on the object and a boundary of the object.

6. The method of claim 5, wherein the point on the object is a center of the object.

7. The method of claim 6, wherein the boundary is a geometric shape defined relative to the center of the object.

8. The method of claim 5, wherein the criterion is further satisfied when the distance between the location on the display corresponding to the user interaction and the location of the point on the object is such that the location point lies outside the boundary.

9. A head-mounted display device including a display for providing feedback to a user, the head-mounted display device comprising:
means for obtaining, outside of any user interaction calibration process, a location on the display corresponding to a user interaction;
means for determining a location of a point on an object displayed on the display;
means for determining, outside of any user interaction calibration process, an offset, wherein the offset is associated with a distance between the location on the display corresponding to the user interaction and the location of the point on the object;
means for determining, outside of any user interaction calibration process, whether the offset satisfies a criterion associated with inaccurate user interaction tracking, wherein the criterion is satisfied when the distance between the location on the display corresponding to the user interaction and the location of the point on the object is greater than a threshold, and wherein the criterion being satisfied is indicative of the inaccurate user interaction tracking; and
means for outputting, outside of any user interaction calibration process, a sensory indication indicative of the inaccurate user interaction tracking when the criterion is satisfied, the sensory indication being one or more of an auditory indication or a haptic indication.

10. The apparatus of claim 9, wherein the user interaction is an eye gaze and the means for obtaining the location on the display is configured to obtain data corresponding to the location on the display from an eye tracking system that tracks user eye gaze.

11. The apparatus of claim 9, wherein the user interaction is a gesture and the means for obtaining a location on the display is configured to obtain data corresponding to the location on the display from a gesture tracking system that tracks user gestures.

12. The apparatus of claim 9, wherein the location on the display corresponding to the user interaction is defined by a location point on the display.

13. The apparatus of claim 12, wherein the threshold is a distance between the point on the object and a boundary of the object.

14. The apparatus of claim 13, wherein the point on the object is a center of the object.

15. The apparatus of claim 14, wherein the boundary is a geometric shape defined relative to the center of the object.

16. The apparatus of claim 13, wherein the criterion is further satisfied when the distance between the location on the display corresponding to the user interaction and the location of the point on the object is such that the location point lies outside the boundary.

17. A head-mounted display device for providing feedback to a user, the head-mounted display device comprising:
a display;
a memory; and
at least one processor coupled to the memory, wherein the at least one processor is configured to:
obtain, outside of any user interaction calibration process, a location on the display corresponding to a user interaction;
determine a location of a point on an object displayed on the display;
determine, outside of any user interaction calibration process, an offset, wherein the offset is associated with a distance between the location on the display corresponding to the user interaction and the location of the point on the object;
determine, outside of any user interaction calibration process, whether the offset satisfies a criterion associated with inaccurate user interaction tracking, wherein the criterion is satisfied when the distance between the location on the display corresponding to the user interaction and the location of the point on the object is greater than a threshold, and wherein the criterion being satisfied is indicative of the inaccurate user interaction tracking; and
output, outside of any user interaction calibration process, a sensory indication indicative of the inaccurate user interaction tracking when the criterion is satisfied, the sensory indication being one or more of an auditory indication or a haptic indication.

18. The apparatus of claim 17, wherein the user interaction is an eye gaze and to obtain the location on the display, the at least one processor is configured to obtain data corresponding to the location on the display from an eye tracking system that tracks user eye gaze.

19. The apparatus of claim 17, wherein the user interaction is a gesture and to obtain the location on the display, the at least one processor is configured to obtain data corresponding to the location on the display from a gesture tracking system that tracks user gestures.

20. The apparatus of claim 17, where the location on the display corresponding to the user interaction is defined by a location point on the display.

21. The apparatus of claim 20, wherein the threshold is a distance between the point on the object and a boundary of the object.

22. The apparatus of claim 21, wherein the point on the object is a center of the object.

23. The apparatus of claim 21, wherein the criterion is further satisfied when the distance between the location on the display corresponding to the user interaction and the location of the point on the object is such that the location point lies within the boundary.

24. A non-transitory computer-readable medium of a head-mounted display device having a display, the non-transitory computer-readable medium having code stored thereon that, when executed, causes the head-mounted display device to:
obtain, outside of any user interaction calibration process, a location on the display corresponding to a user interaction;
determining a location of a point on an object displayed on the display;
determine, outside of any user interaction calibration process, an offset, wherein the offset is associated with a distance between the location on the display corresponding to the user interaction and the location of the point on the object;
determine, outside of any user interaction calibration process, whether the offset satisfies a criterion associated with inaccurate user interaction tracking, wherein the criterion is satisfied when the distance between the location on the display corresponding to the user interaction and the location of the point on the object is greater than a threshold, and wherein the criterion being satisfied is indicative of the inaccurate user interaction tracking; and output, outside of any user interaction calibration process, a sensory indication indicative of the inaccurate user interaction tracking when the criterion is satisfied, the sensory indication being one or more of an auditory indication or a haptic indication.

25. The method of claim 1, further comprising:

determining whether the user is initiating an eye fixation; and outputting the sensory indication when the eye fixation is initiated, wherein the eye fixation occurs when a visual eye gaze of the user is on a single location.

\* \* \* \* \*